United States Patent
Qian

(10) Patent No.: US 11,525,062 B2
(45) Date of Patent: *Dec. 13, 2022

(54) RADIATION CURABLE COMPOSITION CONTAINING MODIFIED PIGMENT AND USE THEREOF

(71) Applicant: CHANGZHOU GREEN PHOTOSENSITIVE MATERIALS CO.,LTD., Jiangsu (CN)

(72) Inventor: Bin Qian, Jiangsu (CN)

(73) Assignee: CHANGZHOU GREEN PHOTOSENSITIVE MATERIALS CO., LTD., Jiangsu (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/982,075

(22) PCT Filed: Mar. 20, 2019

(86) PCT No.: PCT/CN2019/078861
§ 371 (c)(1),
(2) Date: Sep. 18, 2020

(87) PCT Pub. No.: WO2019/179461
PCT Pub. Date: Sep. 26, 2019

(65) Prior Publication Data
US 2021/0095140 A1 Apr. 1, 2021

(30) Foreign Application Priority Data
Mar. 20, 2018 (CN) .......................... 201810227975.6

(51) Int. Cl.
C09D 11/03 (2014.01)
C09D 11/10 (2014.01)
C09D 11/037 (2014.01)
C09D 11/101 (2014.01)
C09D 11/102 (2014.01)

(52) U.S. Cl.
CPC .......... *C09D 11/037* (2013.01); *C09D 11/101* (2013.01); *C09D 11/102* (2013.01)

(58) Field of Classification Search
CPC ... C09D 11/037; C09D 11/101; C09D 11/102; C09D 11/103
USPC .......................................... 522/170, 168, 81
See application file for complete search history.

(56) References Cited

U.S. PATENT DOCUMENTS

| | | | | |
|---|---|---|---|---|
| 2,885,366 A | * | 5/1959 | Iler | C04B 14/30 516/90 |
| 3,410,708 A | * | 11/1968 | McGinnis | C09C 1/36 106/437 |
| 3,639,133 A | * | 2/1972 | Linton | C09C 1/20 106/434 |
| 3,647,495 A | * | 3/1972 | Cline | C09C 3/063 106/445 |
| 4,447,270 A | * | 5/1984 | Howard | C09C 1/3661 106/438 |
| 4,447,271 A | * | 5/1984 | Howard | C09C 1/3661 106/438 |
| 4,812,299 A | * | 3/1989 | Wason | C08K 3/34 162/181.8 |
| 4,880,472 A | * | 11/1989 | Bugnon | C09B 67/0007 106/493 |
| 4,923,518 A | * | 5/1990 | Brand | C09C 3/08 106/429 |
| 5,356,617 A | * | 10/1994 | Schlossman | A61K 8/0204 424/401 |
| 5,624,486 A | * | 4/1997 | Schmid | A61Q 1/02 106/31.65 |
| 5,650,002 A | * | 7/1997 | Bolt | C09D 7/62 106/438 |
| 5,753,025 A | * | 5/1998 | Bettier | C09C 3/08 106/442 |
| 5,886,069 A | * | 3/1999 | Bolt | C09C 1/0084 523/223 |
| 6,200,375 B1 | * | 3/2001 | Guez | C09C 1/3661 106/438 |
| 6,695,906 B2 | * | 2/2004 | Hiew | C09C 1/3653 106/442 |
| 6,740,312 B2 | * | 5/2004 | Chopin | C09C 1/3607 424/59 |
| 6,743,286 B2 | * | 6/2004 | Wen | C09C 1/021 106/436 |
| 6,783,586 B2 | * | 8/2004 | Bettier | C09D 5/035 106/442 |
| 7,285,162 B2 | * | 10/2007 | Hua | C09C 1/3676 106/436 |
| 7,288,146 B1 | * | 10/2007 | Nicolai | C09C 1/3661 106/443 |
| 7,371,275 B2 | * | 5/2008 | Bolt | C04B 14/305 106/430 |
| 7,575,731 B2 | * | 8/2009 | Iijima | C09D 7/67 423/69 |

(Continued)

FOREIGN PATENT DOCUMENTS

CN 103080181 A 5/2013
CN 107001826 A 8/2017

(Continued)

*Primary Examiner* — Sanza L. McClendon
(74) *Attorney, Agent, or Firm* — Gang Yu

(57) ABSTRACT

A modified pigment for radiation curable gravure ink, comprising a pigment and inorganic oxide nanoparticles coated on the surface of the pigment, wherein the DBP oil absorption is 150 ml/100 g-250 ml/100 g, the particle size is 0.01 μm-1 μm, and the pH value is 4.5-10.

28 Claims, No Drawings

(56) References Cited

U.S. PATENT DOCUMENTS

| | | | |
|---|---|---|---|
| 8,580,382 B2 * | 11/2013 | Sato | C09C 1/62 |
| | | | 428/403 |
| 8,840,719 B2 * | 9/2014 | Goparaju | C09C 1/3661 |
| | | | 106/442 |
| 9,481,797 B2 * | 11/2016 | Burniston | C09C 1/0087 |
| 9,637,640 B2 * | 5/2017 | Hommes | C09C 1/3661 |
| 9,909,011 B2 * | 3/2018 | Frahm | C09C 1/3684 |
| 2001/0011110 A1 * | 8/2001 | Hayashi | C08K 9/04 |
| | | | 523/212 |
| 2007/0125269 A1 * | 6/2007 | Nishi | C08K 3/36 |
| | | | 106/481 |
| 2009/0136759 A1 | 5/2009 | Shintani et al. | |
| 2011/0268897 A1 * | 11/2011 | Klemann | B41M 5/52 |
| | | | 428/32.19 |

FOREIGN PATENT DOCUMENTS

| | | |
|---|---|---|
| CN | 107286705 A | 10/2017 |
| CN | 107300831 A | 10/2017 |
| CN | 107300832 A | 10/2017 |
| WO | 2017019026 A1 | 2/2017 |

* cited by examiner

RADIATION CURABLE COMPOSITION CONTAINING MODIFIED PIGMENT AND USE THEREOF

TECHNICAL FIELD

The disclosure belongs to the technical field of radiation curing, pigments and printing ink, and particularly relates to a modified pigment for radiation curable gravure ink and use thereof.

BACKGROUND

Gravure ink, also known as gravure liquid ink, is a colored colloidal dispersion system that can be applied to a substrate in an appropriate printing manner to impart a text pattern and a variety of colors.

Most gravure inks are volatile solvent-based inks, which consist of pigments, solid resins, volatile solvents, fillers and additives. With the enhancement of people's awareness of environmental protection and energy saving, water-based inks, light curing inks, electron beam inks and other relative "green" inks have gradually developed and gradually replaced solvent inks to be applied. For Embodiment, Chinese Patent Application Nos. 200580017917.1, 2015102670267, 201510994588.1, U.S. Patent Application Publication No. US 200910136759 A, all disclose energy curing gravure inks that do not contain volatile solvents. However, the attention points in the prior art mostly focus on whether the ink on the engraving plate cylinder is easy to wipe, the appearance of a printed product, the adhesion fastness, the abrasion resistance, the weather resistance and the like, and are little related to how to improve the storage stability of the ink and improve the production efficiency, and also lack effective solutions.

Pigments are an important component of gravure inks and disperse in the ink film former as very small particles, primarily for coloring and covering purposes. The storage stability, viscosity, curing speed and printing performance of the ink are greatly affected by the amount of pigment added in the ink.

SUMMARY

The disclosure mainly aims to provide a modified pigment for radiation curable gravure ink and use thereof, so as to solve the problem of poor storage stability of the pigment-containing ink in the prior art.

In order to achieve the above object, according to one aspect of the present disclosure, a modified pigment for radiation curable gravure ink comprising a pigment and inorganic oxide nanoparticles coated on a surface of the pigment is provided; the modified pigment has a DBP oil absorption of 150 rill/100 g-250 ml/100 g, a particle size of 0.01 μm-1 μm, and a pH value of 4.5-10.

Further, the above inorganic oxide is selected from at least one of silica, titanium dioxide, iron oxide and alumina.

Further, the above modified pigment has the DBP oil absorption of 200 ml/100 g to 250 ml/100 g, preferably 215 ml/100 g to 235 ml/100 g, and the particle size of 0.1 μm to 0.8 μm, preferably 0.45 μm to 0.65 μm.

Further, the pH value of the above modified pigment is 5 to 9, preferably 5.5 to 8.

Further, the above pigment is an organic pigment or an inorganic pigment, preferably the organic pigment is selected from any one of an azo dye, a thioindigo dye, an indanthrone dye, an isoindanthrone dye, an anthanthrone dye, an anthraquinone dye, an isoviolanthrone dye, a triphenyldioxazine dye, a quinacridone dye and a phthalocyanine dye, preferably the inorganic pigment is selected from any one of carbon black, titanium dioxide, silica, alumina, iron oxide and sulfide.

According to another aspect of the present application, the use of a modified pigment as described above in a radiation curable ink composition is provided.

Further, the above radiation curable ink composition is used as a gravure ink.

According to a further aspect of the present application, a radiation curable gravure ink comprising a pigment is provided, the pigment is a modified pigment as described above.

Further, the radiation curable gravure ink further includes a cationic polymerizable compound and a cationic photoinitiator.

Further, the cationic polymerizable compound comprises an oxetane-based compound and an epoxy-based compound, and preferably the cationic polymerizable compound consists of the oxetane-based compound and the epoxy-based compound.

Further, the above epoxy-based compound is an alicyclic epoxy-based compound, preferably an epoxy-based compound having an epoxycyclohexyl group.

Further, a mass ratio of the above oxetane-based compound to the epoxy-based compound is 2-5:1, preferably 2-4:1.

Further, the above cationic photoinitiator is selected from one or a combination of two or more of a group consisted of iodonium salt, sulfonium salt, and arylferrocenium salt.

Further, the radiation curable gravure ink comprises, by weight percent: 2%-20% of modified pigment, preferably 5%-15% of modified pigment; 40%-90% of a cationic polymerizable compound, preferably 45%-80% of a cationic polymerizable compound, more preferably 60%-80% of a cationic polymerizable compound; 1%-25% of a cationic photoinitiator, preferably 3%-20% of a cationic photoinitiator, more preferably 5%-15% of a cationic photoinitiator; 0%-30% of filler, preferably 0%-20% of filler; 0%-5% of sensitizer, preferably 0%-2% of sensitizer.

Further, the radiation curable gravure ink further comprises filler.

Further, the radiation curable gravure ink can further comprise sensitizer, preferably an anthracene sensitizer.

According to a further aspect of the present application, the use of any one of the radiation curable intaglio printing inks described above on paper, plastics, films is provided.

Applying the technical scheme provided by the present disclosure, the inorganic oxide nanoparticle coating treatment carried out on the surface of the pigment can effectively prevent agglomeration of the pigment, the lipophilicity and wettability of the modified pigment can be greatly improved, the stability of an ink dispersion system can be promoted as well, and the storage stability of the ink containing the modified pigment is further improved.

DETAILED DESCRIPTION OF THE EMBODIMENTS

It should be noted that the embodiments of the present disclosure and features in the embodiments can be combined with one another without conflict. The present disclosure will be described in detail below in combination with the embodiments.

In view of the deficiencies and technical development needs of the prior art, it is a first object of the present disclosure to provide a modified pigment for radiation curable gravure inks. The modified pigment applying the radiation curable gravure ink does not need to use any volatile organic solvent, under the conditions of ensuring good appearance, excellent adhesive force and no smell of a printed product, the storage stability of the ink is remarkably improved and the ink shows excellent curing speed.

The modified pigment for the radiation curable gravure ink in the present disclosure comprises pigment and inorganic oxide nanoparticles coated on a surface of the pigment; the modified pigment has a DBP oil absorption of 150 ml/100 g-250 ml/100 g, a particle size of 0.01 μm-1 μm, and a pH value of 4.5-10.

The inventors have surprisingly found that coating the pigment surface with inorganic oxide nanoparticles can be effective in preventing pigment agglomeration. The modified pigment can greatly improve the lipophilicity and wettability thereof, and can promote the stability of the ink dispersion system. The oxide is selected from at least one of silica, titanium dioxide, iron oxide and alumina. The pigments can be organic or inorganic pigments. Suitable organic pigments include: azo (including disazo and condensed azo), thioindigo, indanthrone, isoindanthrone, anthanthrone, anthraquinone, isoviolanthrone, triphenyldioxazine, quinacridone and phthalocyanine dye series. Preferred organic pigments are phthalocyanine dyes (especially copper phthalocyanine pigments), azo pigments, indanthrones, anthanthrone and quinacridone. Suitable inorganic pigments comprise: carbon black, titania silica, alumina, iron oxide and sulfides.

The inventors have found in experiments that the level of oil absorption of the modified pigment and, the size of the particle size have a direct influence on the hue of the printed pattern and the appearance of the printed product. Measured according to the standard GB/T5211.15-1988, the DBP oil absorption of the modified pigment is suitably from 150 ml/100 g to 250 ml/100 g, preferably from 200 ml/100 g to 250 ml/100 g, further preferably from 215 ml/100 g to 235 ml/100 g. The modified pigment suitably has the particle size in the range of 0.01 μm to 1 μm, preferably 0.1 μm to 0.8 μm, further preferably 0.45 μm to 0.65 μm.

Current gravure inks in the art generally do not limit the pH of the included pigments. However, researchers of the present disclosure found that when the pH of the used pigment is ≤4, the printing ink is easy to gel in a storage tank, and the storage time, is shortened; however, when the pH of the pigment is 10, the curing speed of the ink is remarkably prolonged. Therefore, the inventors have determined a suitable pH range through several experiments and repeated verifications, and the pH value of the modified pigment is 4.5 to 10, preferably 5 to 9, and further preferably 5.5 to 8.

The pH value of pigment was influenced by the pigment properties, surface state, processing conditions and surface treatment agent. The pH value of the modified pigment in the present disclosure is determined by dispersing it in distilled water with reference to the national standard GB/T1717-1986, and measuring the pH value of the obtained solution. The specific measurement method comprises: in a glass container, preparing a 10% (m/m) pigment suspension with distilled water, stopping the container with a stopper, shaking vigorously for 1 min, then standing for 5 min, removing the stopper, and the pH of the suspension was measured to be accurate to 0.1 unit.

It can be seen therefrom that the present disclosure can effectively prevent pigment agglomeration by carrying out inorganic oxide nanoparticle coating treatment on the pigment surface, and the stability of the gravure ink adopting the pigment can be further improved by controlling the pH value of the modified pigment; and the DBP oil absorption amount and the particle size range of the modified pigment are further controlled, so that the hue and the printed product appearance of the printed pattern printed by the pigment are improved.

In view of the excellent characteristics of the above-mentioned modified pigments according to the present disclosure, it is also an object of the disclosure to provide the use of the above-mentioned modified pigments in radiation curable ink compositions, which are particularly suitable for use as gravure ink.

Accordingly, the present disclosure provides a radiation curable gravure ink comprising the modified pigment (A) described above. The content of the modified pigment is 2%-20%, preferably 5%-15%, based on the total weight of the gravure ink.

In addition to the modified pigment (A) described above, the radiation curable gravure ink of the present disclosure particularly suitably comprises a cationic polymerizable compound (B) and a cationic photoinitiator (C).

Other components included in the gravure ink is described in more detail below.

<Cationic Polymerizable Compound (B)>

Common cationic polymerizable compounds in the field of radiation curable comprise oxetane-based compounds, epoxy-based compounds and vinyl ether compounds.

In the gravure ink of the present disclosure, it is advantageous to use oxetane-based compound as cationic polymerizable compound to obtain better curing speed. Meanwhile, the oxetane-based compound (B1) and the epoxy-based compound (B2) are preferably used together in consideration of physical characteristics such as printed product appearance, substrate adhesiveness and the like.

Suitable oxetane-based compound (B1) can be monofunctional compound or polyfunctional compound. Examples of monofunctional groups include, but are not limited to: 3-methyl-3-hydroxymethyloxetane, 3-ethyl-3-hydroxymethyloxetane, 3-ethyl-3-(hexyloxymethyl) oxetane, 3-ethyl-3-(2-ethylhexyloxymethyl) oxetane, 3-ethyl-3-[(phenoxy) methyl] oxetane, 3-ethyl-3-(chloromethyl) oxetane, iso butoxymethyl (3-ethyl-3-oxetanylmethyl) ether, isobornyloxyethyl (3-ethyl-3-oxetanylmethyl) ether, isobornyl (3-ethyl-3-oxetanylmethyl) ether, 2-ethylhexyl (3-ethyl-3-oxetanylmethyl) ether, ethyldiglycol (3-ethyl-3-oxetanylmethyl) ether and the like. Examples of polyfunctional groups include, but are not limited to: bis [1-ethyl (3-oxetanyl)] methyl ether, 3,3-bis (chloromethyl) oxetane, 3,7-bis (3-oxetanyl)-5-oxa-nonane, 1,2-bis [(3-ethyl-3-oxetanylmethoxy) methyl] ethane, 1,3-bis [(3-ethyl-3-oxetanylmethoxy) methyl] propane, ethylene glycol bis (3-ethyl-3-oxetanylmethyl) ether, tricyclodecanediyldimethylene (3-ethyl-3-oxetanylmethyl) ether, trimethylolpropane tris (3-ethyl-3-oxetanylmethyl) ether, 1,4-bis[(3-ethyl-3-oxetanylmethoxy) methyl] benzene, 1,4-bis (3-ethyl-3-oxetanylmethoxy) butane, 1, 6-bis (3-ethyl-3-oxetanylmethoxy) hexane, pentaerythritol tris (3-ethyl-3-oxetanylmethyl) ether, pentaerythritol tetrakis (3-ethyl-3-oxetanylmethyl) ether, polyethylene glycol bis (3-ethyl-3-oxetanylmethyl) ether, dipentaerythritol hexa (3-ethyl-3-oxetanylmethyl) ether, dipentaerythritol penta (3-ethyl-3-oxetanylmethyl) ether, dipentaerythritol tetrakis (3-ethyl-3-oxetanylmethyl) ether and the like. In addition, oxetanes disclosed in Chinese patent applications with application NOs. 201610548580.7, 201610550205.6, 201710706339.7 and 201710622973.2, which are incorporated herein by reference in their entirety, can also be used in the compositions.

From the viewpoint of overall application properties, it is further preferred that the oxetane-based compound (B1) is selected from at least one of the following compounds.

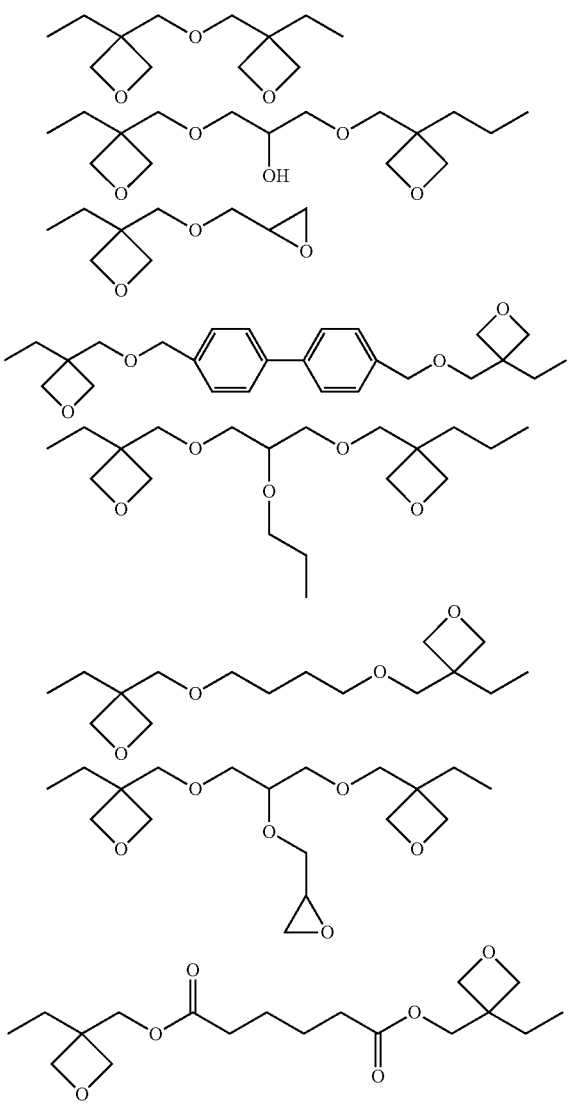

As the suitable epoxy-based compound (B2), it can be at least one of an alicyclic epoxy compound, a hydrogenated epoxy compound, an aromatic epoxy compound, an aliphatic epoxy compound, and preferably an alicyclic epoxy compound.

As used herein, an "alicyclic epoxy compound" refers to a compound having an alicyclic epoxy group. From the viewpoint of further improving the curing speed, it is contemplated to use a polyfunctional alicyclic, epoxy compound having 2 or more alicyclic epoxy groups in the molecule, or an alicyclic epoxy compound having 1 alicyclic epoxy group in the molecule and having an, unsaturated double bond group such as a vinyl group.

As the alicyclic epoxy compound suitable for use in the gravure ink of the present disclosure, epoxy-based compound having an epoxycyclohexyl group are preferred, such as 3,4-epoxycyclohexylmethyl-3',4'-epoxycyclohexylcarboxylate, ε-caprolactone-modified-3, 4-epoxycyclohexylmethyl-3',4'-epoxycyclohexylcarboxylate, bis ((3,4-epoxycyclohexyl) methyl) adipate, epoxycyclohexane, 2-(3,4-epoxycyclohexane) ethyltrimethoxysilane, 3,4-epoxycyclohexylmethyl methacrylate, 3,4-epoxycyclohexylmethacrylate, 1,2-epoxy-4-vinylcyclohexane, 4-vinyl-1-cyclohexenediepoxide, dicyclononadiene diepoxide, 3,4-epoxycyclohexane carboxylate, the polymerization product of 3,4-epoxycyclohexylmethyl-3',4'-epoxycyclohexylformate and caprolactone, 4-methyl-1,2-epoxycyclohexane, 2,2-bis (3,3'-epoxycyclohexyl) propane, 2-(3,4-epoxycyclohexane) ethyltrimethoxysilane and the like.

As the above-mentioned hydrogenated epoxy compound, a compound having a glycidyl ether group directly or indirectly bonded to a saturated aliphatic cyclic hydrocarbon skeleton is preferable, and a polyfunctional glycidyl ether compound is suitable. Such hydrogenated epoxy compounds are preferably full or partial hydrides of aromatic epoxy compounds, more preferably hydrides of aromatic glycidyl ether compounds, further preferably hydrides of aromatic multifunctional glycidyl ether compounds. In particular, it can be selected from hydrogenated bisphenol A type epoxy compounds, hydrogenated bisphenol S type epoxy compounds, hydrogenated bisphenol F type epoxy compounds, and the like. More preferred are hydrogenated bisphenol A type epoxy compounds, hydrogenated bisphenol F type epoxy compounds.

The above-mentioned aromatic epoxy compound is a compound having an aromatic ring and an epoxy group in the molecule. As the aromatic epoxy compound, it can be an epoxy compound having an aromatic ring conjugate system such as a bisphenol skeleton, a fluorene skeleton, a biphenyl skeleton, a naphthalene ring, an anthracene ring, and the like. Among them, in order to achieve a higher refractive index, a compound having a bisphenol skeleton and/or a fluorene skeleton is preferable, and a compound having a fluorene skeleton is more preferable, where by the refractive index can be more remarkably improved, and the demoldability can be further improved. In addition, a compound in which the epoxy group in the aromatic epoxy compound is a glycidyl group is preferred, and a compound in which the epoxy group is a glycidyl ether group (i.e., an aromatic glycidyl ether compound) is more preferred. In addition, the use of a bromide of an aromatic epoxy compound can also achieve a higher refractive index and is thus suitable, but since the Abbe number is slightly increased, it is preferably used as appropriate depending on the application.

As the above-mentioned aromatic epoxy compound, preferable examples include a bisphenol A type epoxy compound, a bisphenol F type epoxy compound, a fluorene type epoxy compound, an aromatic epoxy compound having a bromine substituent, and the like. Among them, a bisphenol A type epoxy compound and a fluorene type epoxy compound are more preferable.

As the above aromatic glycidyl ether compound, it can be an Epi-bis type glycidyl ether type epoxy resin, a high molecular weight Epi-bis type glycidyl ether type epoxy resin, a phenolic resin varnish, an aralkyl type glycidyl ether type epoxy resin, and the like.

The Epi-bis type glycidyl ether type epoxy resin can be a resin obtained by condensation reaction of bisphenols such as bisphenol A, bisphenol F, bisphenol S, fluorene bisphenol and the like with epoxyhalopropane.

The high molecular weight Epi-bis type glycidyl ether type epoxy resin can be a resin obtained by addition reaction of the above-mentioned Epi-bis type glycidyl ether type epoxy resin and the above-mentioned bisphenols such as bisphenol A, bisphenol F, bisphenol S, fluorene bisphenol, etc.

As the above-mentioned aromatic glycidyl ether compound, preferred examples include, but are not limited to: bisphenol A type compounds such as 828EL, 1003, 1007 produced by Japan Epoxy Resin Corporation, fluorene type compounds such as ONCOATEX-1020, ONCOATEX-1010, OGSOLEG-210, OGSOLPG produced by OSAKA-GAS CHEMICALS, and the like. Of these, OGSOLEG-210 is particularly preferred.

The above aliphatic epoxy compound is a compound having an aliphatic epoxy, such as an aliphatic glycidyl ether type epoxy resin. Preferred examples of the aliphatic glycidyl ether type epoxy resin include, but are not limited to, a resin obtained by a condensation reaction of polyhydroxy compounds with epoxyhalopropane, the polyhydroxy compounds selected from the group consisting of ethylene glycol, diethylene glycol, triethylene glycol, tetraethylene glycol, polyethylene glycol, propylene glycol, dipropylene glycol, tripropylene glycol, tetrapropylene glycol, polypropylene glycol, glycerol, diglycerol, tetraglycerol, polyglycerol, trimethylolpropane and polymers thereof, pentaerythritol and polymers thereof, mono/polysaccharides (e.g., glucose, fructose, lactose, maltose, etc.), and the like. Among them, an aliphatic glycidyl ether type epoxy resin having a propylene glycol skeleton, an alkylene skeleton, an alkylene oxide skeleton in the central skeleton is more suitable.

Examples of such vinyl ether compounds include, but are not limited to: aryl vinyl ethers such as phenyl vinyl ethers; alkyl vinyl ethers such as n-butyl vinyl ether, n-octyl vinyl ether and the like; cycloalkyl vinyl ethers such as cyclohexyl vinyl ethers; hydroxyl-containing vinyl ethers such as 2-hydroxyethyl vinyl ether, diethylene glycol monovinyl ether, 2-hydroxybutyl vinyl ether and the like; hydroquinone divinyl ether, 1, 4-butanediol divinyl ether, cyclohexane divinyl ether, cyclohexane dimethanol divinyl ether, ethylene glycol divinyl ether, diethylene glycol divinyl ether, triethylene glycol divinyl ether and other multifunctional vinyl ethers and the like.

In addition to the above, compounds having different kinds of cationic polymerizable groups within the molecule can also be used as the cationic polymerizable compound. For example, as examples having both an epoxy group (e.g., an alicyclic epoxy group) and a vinyl ether group in the molecule, those compounds described in Japanese Publication No. 2009-242242 can be used; as examples having both oxetanyl and vinyl ether groups in the molecule, those compounds described in Japanese Publication No. 2008-266308 can be used.

The content of the cationic polymerizable compound of component (B) in the gravure ink can be appropriately adjusted according to the kind and performance requirements of the substrate, and is suitably from 40% to 90% by mass, preferably from 45% to 80% by mass, and further preferably from 60% to 80% by mass. Among them, the mass ratio of the oxetane-based compound (B1) to the epoxy-based compound (B2) is preferably 2-5:1, more preferably 2-4:1.

<Cationic Photoinitiator (C)>

The component (C) cationic photoinitiator can be selected from one or a combination of two or more of iodonium salts, sulfonium salts, and arylferrocenium salts.

Based on the consideration of cost, the effect of co-use such as photoinitiation efficiency, curing speed and other comprehensive factors, component (C) is preferably an iodonium salt and/or a sulfonium salt photoinitiator, such as: at least one of

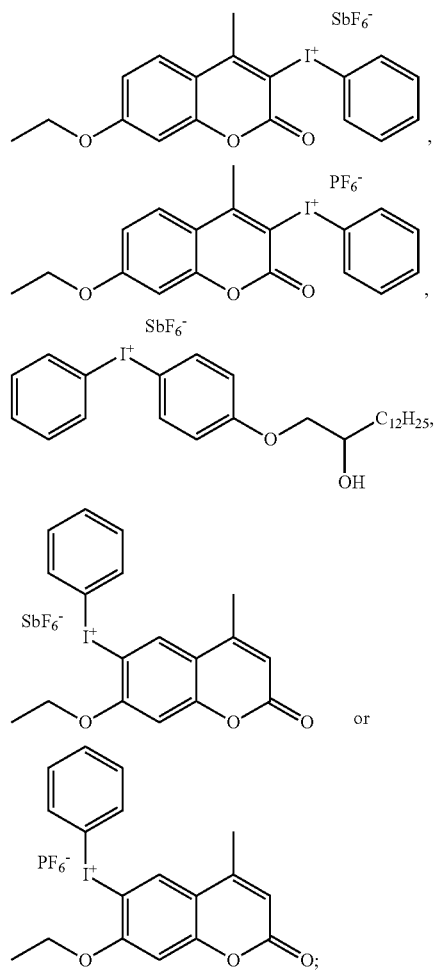

or selected from compounds having a structure represented by following formula (I), (II), (III) and/or (V):

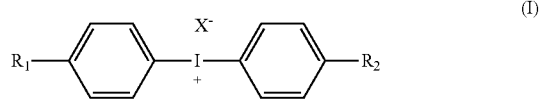

(I)

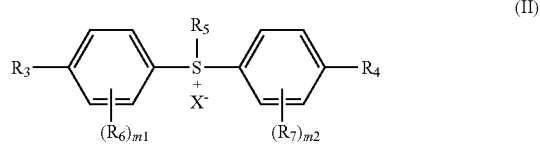

(II)

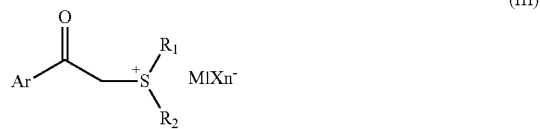

(III)

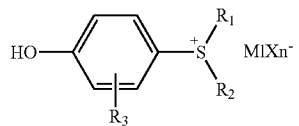

wherein $R_1$ and $R_2$ each independently represent hydrogen, a $C_1$-$C_{20}$ linear or branched alkyl, a $C_4$-$C_{20}$ cycloalkylalkyl or alkylcycloalkyl, and the acyclic —$CH_2$— in these groups is optionally substituted with —O—, —S— or 1, 4-phenylene;

$R_3$ and $R_4$ each independently represent hydrogen, a $C_1$-$C_{20}$ linear or branched alkyl, a $C_4$-$C_{20}$ cycloalkylalkyl or alkylcycloalkyl, a $C_6$-$C_{20}$ substituted or unsubstituted aryl and the acyclic —$CH_2$— in these groups is optionally substituted with —O—, —S— or 1, 4-phenylene;

R5 represents a $C_6$-$C_{20}$ substituted or unsubstituted aryl, a $C_6$-$C_{20}$ substituted or unsubstituted alkylaryl, a $C_1$-$C_{20}$ linear or branched alkyl, a $C_4$-$C_{20}$ cycloalkylalkyl or alkylcycloalkyl, a substituted or unsubstituted phenylthiophenyl, and the acyclic —$CH_2$— in these groups can be optionally substituted by a carbonyl, —O—, —S— or 1, 4-phenylene;

$R_6$ and $R_7$ each independently represent alkyl, hydroxy, alkoxy, alkylcarbonyl, arylcarbonyl, alkoxycarbonyl, aryloxycarbonyl, arylthiocarbonyl, acyloxy, arylthio, aryl, heterocycloalkyl, aryloxy, alkylsulfinyl, arylsulfinyl, alkylsulfonyl, arylsulfonyl, hydroxy (poly) alkyleneoxy, substitutable amino, cyano, nitro, or a halogen atom:

m1 and m2 represent the number of $R_6$ and $R_7$, respectively, selected from 0, 1, 2, 3 or 4.

$X^-$ each independently represents $M^-$, $ClO_4^-$, $CN^-$, $HSO_4^-$, $NO_3^-$, $CF3COO^-$, $(BM_4)^-$, $(SbM_6)^-$, $(AsM_6)^-$, $(PM_6)^-$, $Al[OC(CF_3)_3]_4^-$, a sulfonate ion, $B(C_6M_5)_4^-$ or $[(Rf)_bPF_{6-b}]^-$, wherein M is a halogen (such as F, Cl, Br, I), Rf each independently represents an alkyl group in which ≥80% of hydrogen atoms are replaced by fluorine atoms, and b represents an integer of 1 to 5;

$MtXn^-$ is a non-nucleophilic anion such as $BF_4^-$, $ClO_4^-$, $FSO_3^-$, $PF_6^-$, $ASF_6^-$, $SbF_6^-$, $CF_3SO_3^-$ and $(C_6H_5)_4B^-$.

As a preferred structure, in the compounds of formulae (I) and (II):

$R_1$ and $R_2$ each independently represent hydrogen, a $C_1$-$C_{12}$ linear or branched alkyl, a $C_4$-$C_{10}$ cycloalkylalkyl or alkylcycloalkyl, and the acyclic —$CH_2$— in these groups is optionally substituted with —O—;

$R_3$ and $R_4$ each independently represent hydrogen, a $C_1$-$C_{10}$ linear or branched alkyl, a $C_4$-$C_{10}$ cycloalkylalkyl or alkylcycloalkyl, a $C_6$-$C_{12}$ substituted or unsubstituted aryl and the acyclic —$CH_2$— in these groups is optionally substituted with —O—, —S— or 1, 4-phenylene;

R represents a $C_6$-$C_{10}$ substituted or unsubstituted aryl, a $C_6$-$C_{10}$ substituted or unsubstituted alkylaryl, a substituted or unsubstituted phenylthiophenyl, and the acyclic —$CH_2$— in these groups can be optionally substituted by a carbonyl, —O—, —S— or 1, 4-phenylene;

$R_6$ and $R_7$ represent a $C_1$-$C_{10}$ linear or branched alkyl, a $C_1$-$C_{10}$ linear or branched alkoxy, a $C_1$-$C_{10}$ alkylcarbonyl and a halogen.

Further preferably, the cationic moieties of the above iodonium and sulfonium salt photoinitiators can be exemplified by the following structures:

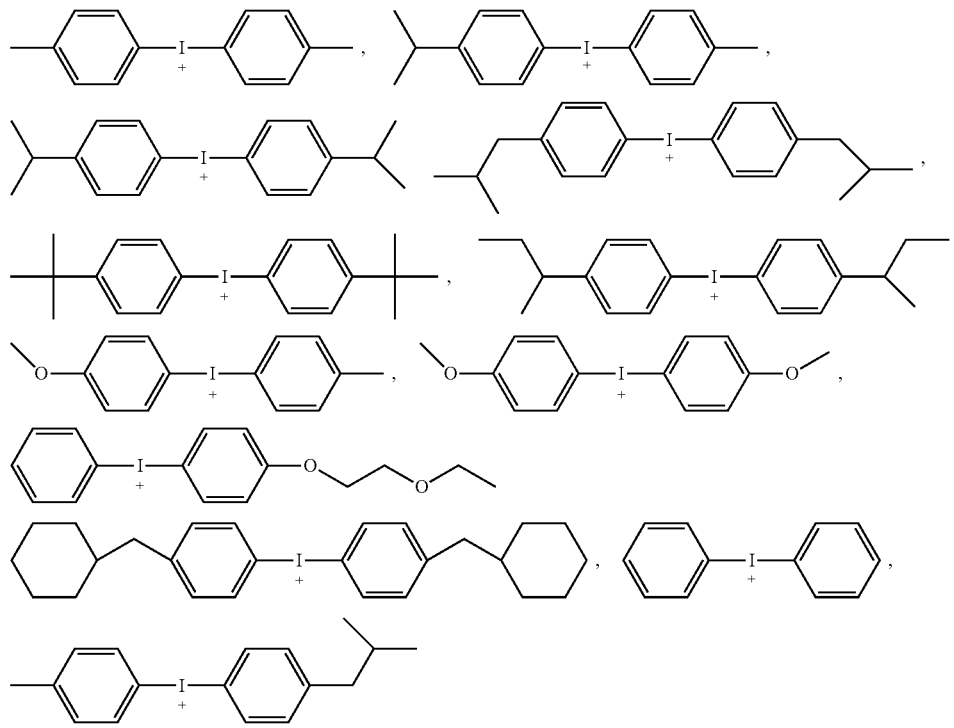

-continued
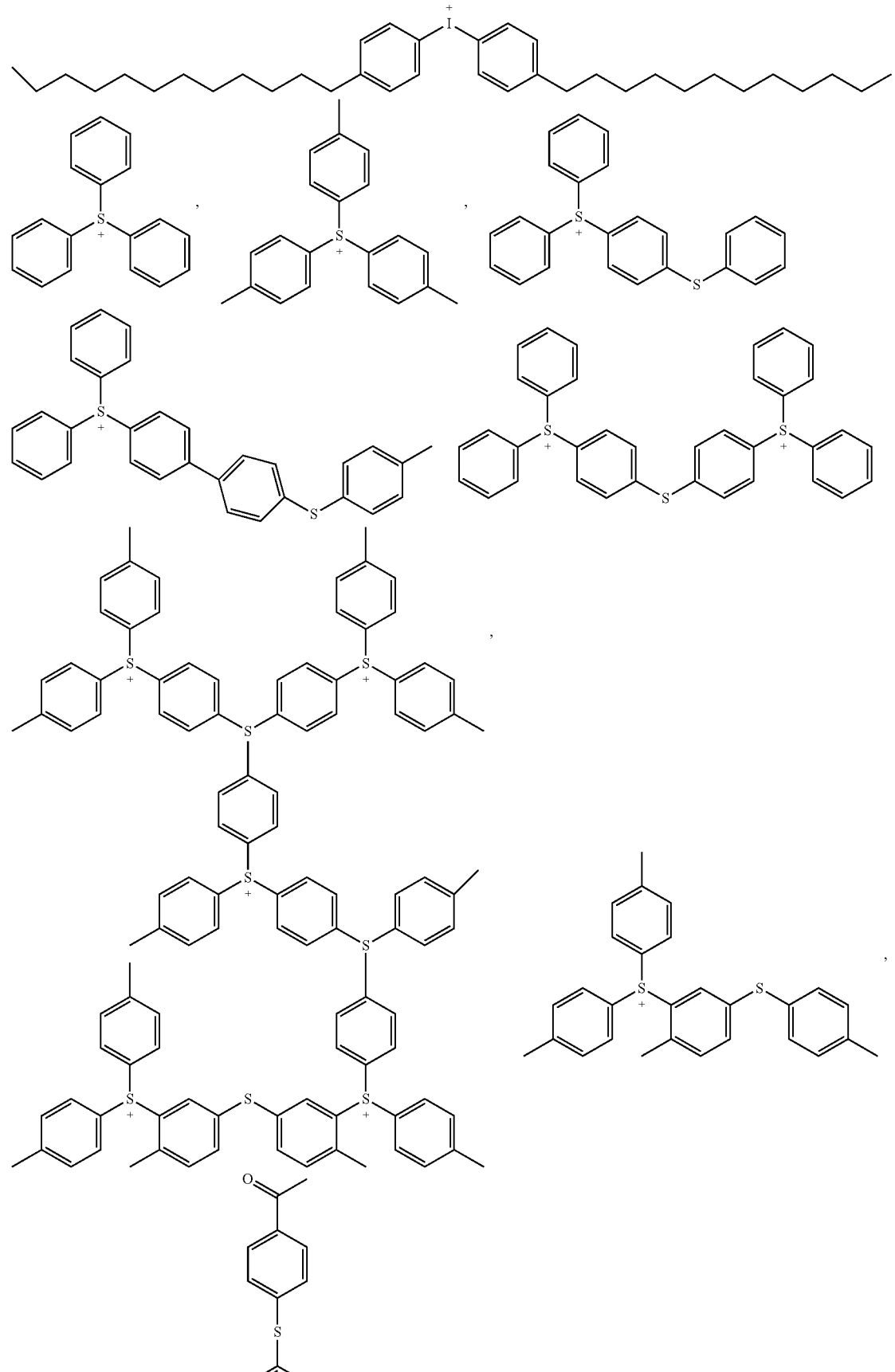

Further preferably, the anionic moieties of the above iodonium and sulfonium salt photoinitiators can be exemplified by: $Cl^-$, $Br^-$, $PF_6^-$, $SbF_6^-$, $AsF_6^-$, $BF_4^-$, $C_4F_9SO_3^-$, $B(C_6H_5)_4^-$, $C_8F_{17}SO_3^-$, $CF_3SO_3^-$, $Al[OC(CF_3)_3]_4^-$, $(CF_3CF_2)_2PF_4^-$, $(CF_3CF_2)_3PF_3^-$, $[(CF_3)_2CF_2]_2PF_4^-$, $[(CF_3)_2CF_2]_3PF_3^-$, $[(CF_3)_2CFCF_2]_2PF_4^-$ and $(CF_3)_2CFCF_2]_3PF_3^-$.

Commercially available cationic photoinitiators having a homogeneous structure can also be used in component (C) of the present disclosure, such as, but not limited to: PAG20001, PAG20002, PAG30201, PAG30101 and the like produced by TRONLY, Irgacure250 and the like produced by BASF Corporation, Germany.

The content of the cationic photoinitiator (C) in the gravure ink of the present disclosure is 1% to 25%, preferably 3% to 20%, more preferably 5% to 15% by mass percent.

<Filler (D)>

Optionally, the radiation curable gravure ink of the present disclosure further comprises a filler (D). The kind of the component (D) filler is not particularly limited, and those conventionally used in gravure inks can be used. Typically, the filler can be selected from at least one of nano calcium carbonate, aluminum hydroxide, barium sulfate, silica, talc, and kaolin.

The content of component (D) in the gravure ink is 0% to 30%, preferably 0% to 20% by mass percent.

<Other Optional Components>

In addition to the above-mentioned components (A) to (D), according to the requirements of the product application environment, the gravure ink of the present disclosure can optionally be added with organic and/or inorganic auxiliaries commonly used in the art, including, but not limited to, leveling agents, dispersing agents, curing agents, surfactants, defoaming agents, storage enhancers, and the like, as would be readily determined by a person skilled in the art. The total auxiliary content is 0%-5%, preferably 0%-3% by mass.

In addition, a sensitizer can be added into the system for the purpose of improving the sensitivity of the gravure ink. Especially when the radiation source is an LED, a sensitizer tends to be added to the gravure ink. The type of sensitizer can be a pyrazoline compound, an acridine compound, an anthracene compound, a naphthalene compound, a coumarin compound, a tertiary amine compound and the like. As the anthracene sensitizer compound, a compound having a structure represented by the following formula (III) and/or (IV) is preferred:

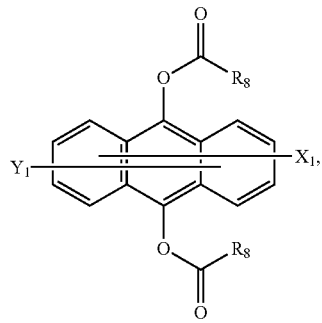

(III)

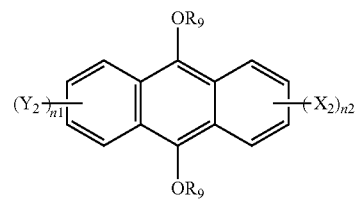

(IV)

In the general formula (III), $R_8$ represents $C_1$-$C_{12}$ alkyl, $C_1$-$C_{12}$ aryl, $C_1$-$C_8$ alkoxy or aryloxy, $C_3$-$C_{12}$ cycloalkyl, $C_4$-$C_{12}$ alkylcycloalkyl or cycloalkylalkyl, wherein one or more hydrogens in these groups can be substituted by halogen and hydroxyl; $X_1$ and $Y_1$ represent, independently from each other, hydrogen, an alkyl, an alkoxy, a halogen atom, a nitro, a sulfonic acid, a hydroxyl and an amino group.

In the general formula (IV), $R_9$ represents $C_1$-$C_{12}$ alkyl, $C_1$-$C_{12}$ aryl, $C_1$-$C_8$ alkoxy or aryloxy, $C_3$-$C_{12}$ cycloalkyl, $C_4$-$C_{12}$ alkylcycloalkyl or cycloalkylalkyl, wherein one or more hydrogens in these groups can be substituted by halogen and hydroxyl; n1 and n2 independently from each other represent an integer of 0 to 4, $X_2$ and $Y_2$, which can be the same or different, independently from each other represent hydrogen, an alkyl, an alkoxy, a halogen atom, a nitro, a sulfonic acid, a hydroxyl and an amino group, and when n1 and n2 represent 2 or more, $X_2$ and $Y_2$ can be the same or different from each other.

Illustratively, the anthracene compound can be one or more combinations of the compounds shown below:

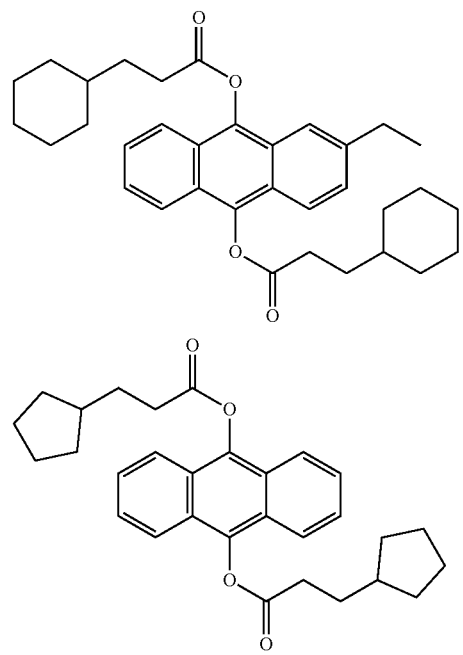

-continued
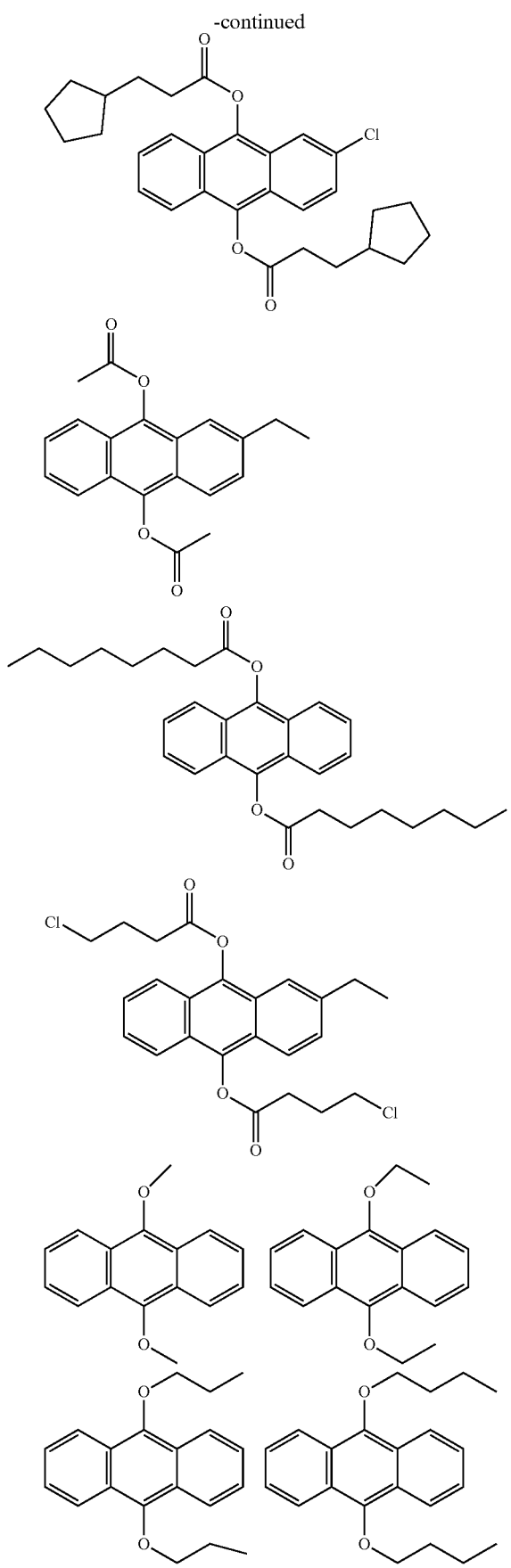
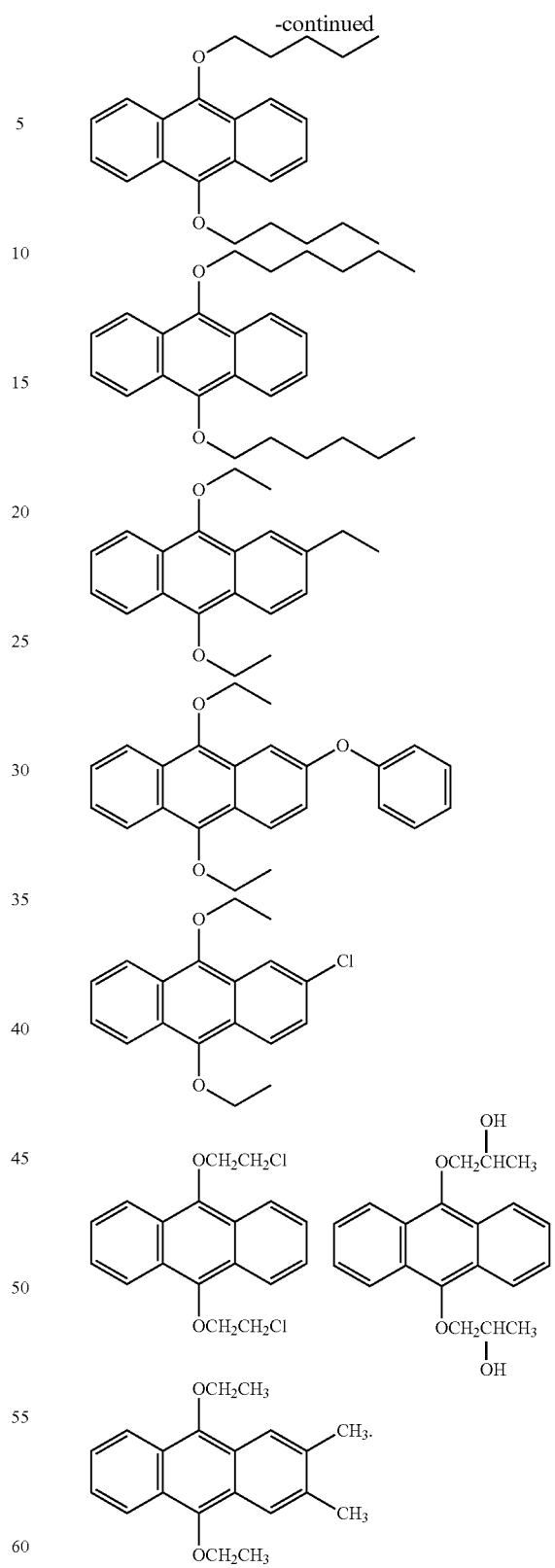
The mass percentage content of the sensitizer in the gravure ink can be 0% to 5%, preferably 0% to 2%.
Under the energy radiation of ultraviolet rays, visible light, infrared rays, electron beams, laser and the like, the gravure ink provided by the disclosure is polymerized, so that rapid drying is realized. As the energy-imparting light source, a main wavelength in the region of 250 nm to 450 nm is preferable, and examples include an ultra-high pressure mercury lamp, a high pressure mercury lamp, a medium pressure mercury lamp, a mercury xenon lamp, a metal halide lamp, a high-power metal halide lamp, a xenon lamp, a pulse-emitting xenon lamp, a deuterium lamp, an LED lamp, a fluorescent lamp, a Nd-YAG triple-frequency laser, a He—Cd laser, a nitrogen laser, a Xe—Cl excimer laser, a Xe—F excimer laser, semiconductor excitation solid laser and other light sources.

The ingredients of each component are uniformly mixed to obtain the radiation curable gravure ink of the present disclosure, and the specific preparation process can refer to those conventional methods in the field of radiation curable compositions. Typically, the preparation process comprises: the pigment is modified and then dosed, predispersed, ground, filtered (filtered through a sieve of specified size to obtain a product with the desired particle size) under conditions of constant temperature and humidity and avoidance of radiation sources.

The radiation curable gravure ink disclosed by the disclosure is excellent in storage stability, capable of printing at high speed, high in production efficiency, suitable for various substrates, particularly suitable for the surfaces of bearing objects such as paper, plastics, films and the like, and the formed printed product is good in appearance, strong in adhesive force, odorless and strong in market competitiveness.

The present disclosure will be described in further detail below with reference to specific examples, which should not be construed as limiting the scope of the disclosure.

1. Preparation of Modified Pigments (1) Inorganic Modified Pigment

Drying carbon black a-1 (Mitsubishi Chemical, MA100) at 60° C.-70° C. for 3 h and then grinding in a mortar to an average particle size of about 0.3 μm. Subsequently, weighing 100 g carbon black into a 1 L flask and adding 800 ml deionized water, stirring and ultrasonically dispersing into a homogeneous suspension.

Heating the suspension in a constant-temperature water bath and stabilizing around 65° C. and adjusting the pH to 9.

Preparing a solution by weighing 11.8 g $Na_2SiO_3.9H_2O$ in 110 ml water, slowly dropwise adding into the flask, stirring at a constant speed, and simultaneously dropwise adding 10% hydrochloric acid to adjust the pH value to the range of 4-9. After the addition, stirring at constant temperature for 30 min.

After the reaction is completed, filtering the suspension, washing with deionized water, drying at 105° C. for 20 min, and determining by TEM detection to obtain the silica-coated black modified pigment A-1.

The modified pigment A-1 was determined to have a DBP oil absorption value of 220 m/100 g, an average particle size of 0.46 μm (determined by TEM), and a pH value of 8.

Referring to the preparation method of A-1, carbon black a-1 is replaced with other kinds of inorganic pigments for the same oxide coating modification treatment to obtain corresponding modified pigments. The following table shows:

TABLE 1

| Pigment selected | Modified pigments | DBP oil absorption ml/100 g | Particle size μm | pH value |
|---|---|---|---|---|
| Titanium | A-2 | 215 | 0.55 | 7.2 |

TABLE 1-continued

| Pigment selected | Modified pigments | DBP oil absorption ml/100 g | Particle size μm | pH value |
|---|---|---|---|---|
| dioxide R706 (a-2) | | | | |

(2) Organic Modified Pigment

Taking 150 g calcium chloride solution with a mass fraction of 20%, 40 g absolute ethyl alcohol and 20 g hydrochloric acid solution with a mass fraction of 10%, mixing, stirring at 350 r/min for 30 min, adding 30 g nano silica, carrying out ultrasonic dispersion for 30 min to obtain a dispersion liquid, introducing carbon dioxide gas into the dispersion liquid until no precipitation occurs, standing for 8-10 h, and filtering to obtain filter residue; washing the filter residue with deionized water for 3-5 times, transferring into a drying box, and drying to constant weight under 105-110° C. to obtain the ink absorption substrate.

Taking 10 g ink absorption substrate and 20 g C. I. pigment blue 61 (a-3), adding to 400 g sodium carbonate solution with a mass fraction of 5%, and stirring at 350 r/min for 24 h in a 45° C. constant-temperature water bath to obtain a loading solution.

Adding 100 g tetrabutyl titanate, 1-2 g silane coupling agent KH-560 and 200 ml deionized water into the loading solution, uniformly mixing, and stirring for 5 h at 350 r/min in a 90° C. constant-temperature water bath to obtain a titanium dioxide-coated organic pigment mixed solution.

Putting the coated organic pigment mixed solution into a hydrothermal reaction kettle, carrying out heat preservation reaction at 110° C. for 5 h, cooling to room temperature, filtering to obtain a filter cake, washing the filter cake with deionized water twice, transferring the filter cake into a drying oven, drying to constant weight at 105° C., putting the dried product into a grinder, and grinding to obtain the organic modified pigment A-3. The organic modified pigment A-3 is determined to have a core-shell coating structure by TEM detection.

The modified pigment A-3 was determined to have a DBP oil absorption value of 225 ml/100 g, an average particle size of 0.56 μm and a pH value of 5.5.

Referring to the preparation method of A-3, a-3 is replaced with other kinds of organic pigments for the same oxide coating modification treatment to obtain corresponding modified pigments. The following table shows:

TABLE 2

| Pigment selected | Modified pigments | DBP oil absorption ml/100 g | Particle size μm | pH value |
|---|---|---|---|---|
| Lithol Rubine A68 C.I. PR57: 1 (a-4) | A-4 | 230 | 0.48 | 7.5 |
| Fast Yellow G (a-5) | A-5 | 233 | 0.61 | 6.0 |

2. Preparation of Radiation Curable Gravure Ink

According to the formulations shown in Table 3, stirring the raw materials at constant speed for 1 h by using a high-speed stirrer under yellow light conditions, then grinding with a sander, and then filtering through a filter screen with 1 μm particle size to obtain radiation curable gravure ink.

Unless otherwise indicated, the amounts set forth in the embodiment Embodiments are in parts by mass.

TABLE 3

| Components and parts by mass | Modified pigments 10 | Cationic polymerizable compound | | Cationic photoinitiator C 12 | Filler D 5 | Other components | | |
|---|---|---|---|---|---|---|---|---|
| | | Oxetane-based compound B1 50 | Epoxy-based compound B2 20 | | | Sensitizer 1 | Leveling agent 1 | Polymerization inhibitor 1 |
| Embodiment 1 | A-1 | B1-1 | B2-1 | C-1 | D-1 | E1-1 | E2 | E3 |
| Embodiment 2 | A-2 | B1-1 | B2-1 | C-1 | D-2 | E1-2 | | |
| Embodiment 3 | A-3 | B1-1 | B2-1 | C-2 | D-1 | E1-3 | | |
| Embodiment 4 | A-4 | B1-1 | B2-1 | C-2 | D-1 | E1-1 | | |
| Embodiment 5 | A-5 | B1-1 | B2-1 | C-3 | D-3 | E1-2 | | |
| Embodiment 6 | A-1 | B1-2 | B2-1 | C-3 | D-1 | E1-2 | | |
| Embodiment 7 | A-1 | B1-3 | B2-1 | C-4 | D-1 | E1-3 | | |
| Embodiment 8 | A-2 | B1-4 | B2-1 | C-4 | D-3 | E1-3 | | |
| Embodiment 9 | A-2 | B1-5 | B2-2 | C-1 | D-1 | E1-2 | | |
| Embodiment 10 | A-3 | B1-3 | B2-1 | C-2 | D-1 | E1-3 | | |
| Embodiment 11 | A-4 | B1-3 | B2-2 | C-3 | D-2 | E1-3 | | |
| Embodiment 12 | A-5 | B1-3 | B2-3 | C-4 | D-1 | E1-2 | | |
| Comparative Embodiment 1 | a-1 | B1-1 | B2-1 | C-1 | D-1 | E1-1 | | |
| Comparative Embodiment 2 | a-2 | B1-2 | B2-1 | C-2 | D-2 | E1-1 | | |
| Comparative Embodiment 3 | a-3 | B1-3 | B2-1 | C-3 | D-3 | E1-2 | | |
| Comparative Embodiment 4 | a-4 | B1-1 | B2-2 | C-1 | D-1 | E1-3 | | |

In Table 3, the specific meanings of the components are as follows:

Modified pigment: as shown in "1. Preparation of modified pigments";

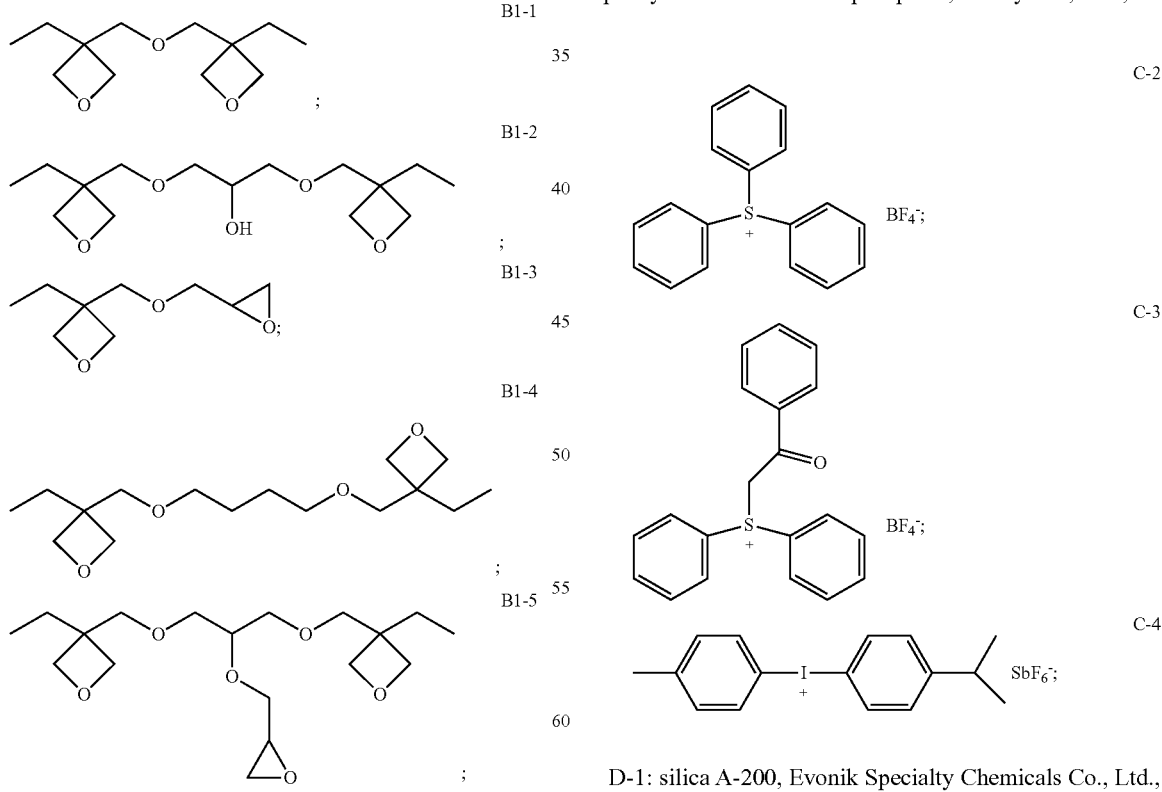

B2-1: 3,4-epoxycyclohexylmethyl-3',4'-epoxycyclohexylformate, Jiangsu Tetra New Material Technology Co., Ltd.;

82-2: bis((3,4-epoxycyclohexyl) methyl) adipate, Jiangsu Tetra New Material Technology Co., Ltd.;

82-3: 4-vinyl-1-cyclohexene diepoxide;

C-1: a mixed salt of bis (4-(diphenyl sulfonium) phenyl) sulfide-bis (hexafluorophosphate) and 4-(thiophenyl) phenyl diphenyl sulfide hexafluorophosphate, Tronly Co., Ltd.;

D-1: silica A-200, Evonik Specialty Chemicals Co., Ltd., Germany;

D-2: titanium dioxide R706, U.S. DuPont;

D-3: calcium carbonate SW-01, Polyplastics Co., Ltd., Japan;

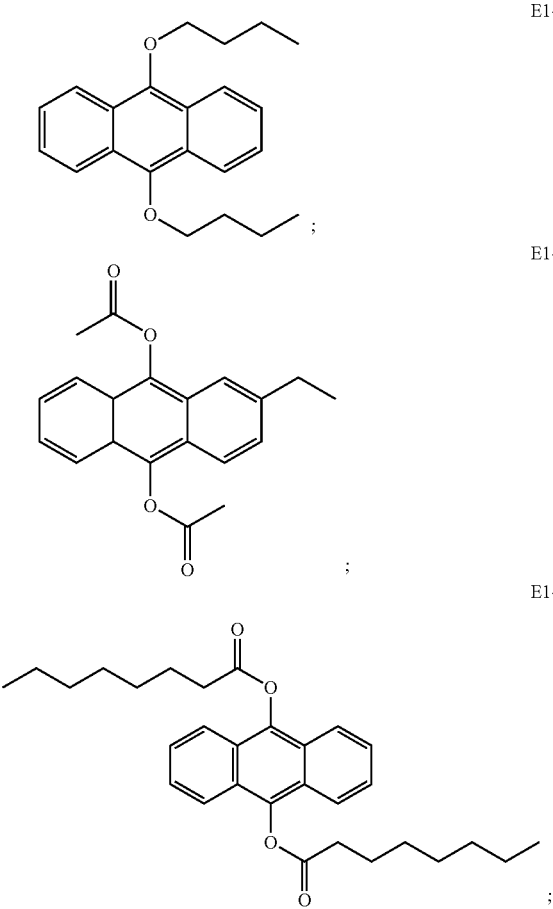

E1-1

E1-2

E1-3

E2: BYK 333, Evonik Specialty Chemicals Co., Ltd., Germany;

E3: hindered nitroxyl stabilizer

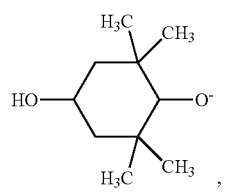

3. Performance Test and Evaluation of Gravure Ink

A Sotech solventless intaglio press (model: A380) for printing, and add an LED lamp with a wavelength of 395 nm as a radiation source on the machine.

The samples of the Embodiments and Comparative Embodiments were tested and evaluated for performance according to QBT 1046-2012 intaglio plastic film surface printing ink industry standard.

(1) Storage Stability Test

The storage stability of the ink to be tested was determined according to GB-T 6753.3-1986 ink storage stability test method. The specific method comprises the following steps of: placing the ink in a 50° C. oven and determining the viscosity of the ink 7 days later. The evaluation grades are as follows:

○: the viscosity increase ratio is below 5%;

◎: the viscosity increase ratio is greater than 5% and less than 10%;

●: the viscosity increase ratio is more than 10%.

(2) Curing and Drying Speed Test

The ink to be tested was transferred to the PET film by an A380 intaglio press to a thickness of about 10 μm. Irradiating with an LED light source having a wavelength of 395 nm, an intensity of 15 w/cm2 was used. The surface curing condition was evaluated with reference to the tacky dry method in the paint film dry time test standard GBIT 1728-1979, i.e. touch the coating lightly with your fingers to confirm that the surface is dry with a smooth surface, no sticky to hands, and no fingerprints.

The drying speed is expressed in units of m/min as the maximum line speed at which the surface drying effect is achieved.

The evaluation results are summarized in Table 4.

4. Test and Evaluation of Print Performance

At the slowest line speed conditions ensuring complete curing and drying of the gravure ink (Embodiments: 180 m/min; Comparative Embodiment: 120 m/min), a gravure ink was printed on a PET film substrate to a thickness of about 10 μm, and after standing for 24 hours, the physical properties of the print, i.e., the cured coating, were tested and evaluated, including adhesion fastness, print appearance, and odor residue.

(1) Adhesion Fastness Test

According to GB/T 13217.7-91 gravure ink detection standards, the specific method is as follows: under the conditions of 25±1° C. and 65%±5% humidity, the tape conforming to the standard GB 7707 was adhered to the ink printing surface and rolled back and forth three times on a tape roller. And placing for 5 min, clamping the sample on disc A, fixing the exposed adhesive tape on the disc B, starting up, rotating the disc A at the speed of 0.6-1.0 m/s to uncover the adhesive tape, and covering the uncovered part with semitransparent millimeter latticed paper with the width of 20 mm. Respectively counting the number of lattices occupied by the ink layer and the number of lattices occupied by the uncovered ink layer, and calculating according to the following formula:

$$A(\%)=[A1/(A1+A2)]\times 100\%$$

In the formula, A represents ink adhesion fastness, A1 represents the number of lattices of the ink layer, and A2 represents the number of lattices of the uncovered ink layer.

A≥90 is understood to comply with performance index.

(2) Printed Product Appearance Test

The test is carried out according to GB/T 7707-2008 gravure printing standard, and the specific method is as follows: putting the print under a light source that meets the requirements of CY/T 3 and identify it by visual inspection. The printed product is clean, without obvious ink stains, tailings, incompleteness, and knife threads, and have smooth edges, uniform ink color, no obvious water lines, no obvious deformation and incompleteness, which is considered qualified; on the contrary, any item that is not ideal is recorded as unqualified.

(3) Odor Residue Test

The cured product was immediately placed in a sealed bag, sealed at room temperature for 24 h, and then the mouth of the bag was opened and judged by human smell. The evaluation grades are as follows:

○: no obvious smell;

x: pungent odor.

The evaluation results are summarized in Table 4.

TABLE 4

| | Storage stability | Curing drying rate | Printed product appearance | Adhesion fastness | Odor performance |
|---|---|---|---|---|---|
| Embodiment 1 | ○ | 195 | Qualified | 92 | ○ |
| Embodiment 2 | ○ | 210 | Qualified | 93 | ○ |
| Embodiment 3 | ○ | 205 | Qualified | 92 | ○ |
| Embodiment 4 | ○ | 205 | Qualified | 93 | ○ |
| Embodiment 5 | ○ | 210 | Qualified | 93 | ○ |
| Embodiment 6 | ○ | 200 | Qualified | 96 | ○ |
| Embodiment 7 | ○ | 215 | Qualified | 95 | ○ |
| Embodiment 8 | ○ | 245 | Qualified | 95 | ○ |
| Embodiment 9 | ○ | 250 | Qualified | 96 | ○ |
| Embodiment 10 | ○ | 255 | Qualified | 95 | ○ |
| Embodiment 11 | ○ | 220 | Qualified | 95 | ○ |
| Embodiment 12 | ○ | 205 | Qualified | 96 | ○ |
| Comparative Embodiment 1 | ◎ | 135 | Unqualified | 92 | ○ |
| Comparative Embodiment 2 | ◎ | 145 | Unqualified | 90 | ○ |
| Comparative Embodiment 3 | ◎ | 150 | Qualified | 93 | ○ |
| Comparative Embodiment 4 | ● | 175 | Unqualified | 89 | ○ |

As can be seen from the evaluation results in Table 4, the gravure ink using the modified pigment has remarkably improved storage stability and is favorable for improving the curing speed of the ink. The adhesion of the coating is good, the printed product pattern is tidy, the edge is smooth, the ink color is uniform, and the product has no obvious smell; In addition, after replacing the initiators in the components of Embodiment 2 and Embodiment 3 with

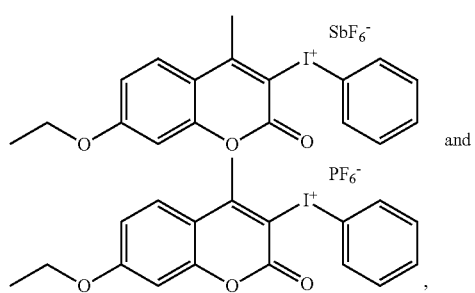

respectively, the same technical effects can be obtained under the same preparation and test conditions.

5. Further Testing and Evaluation of Performance

The radiation curable gravure ink containing the modified pigment disclosed by the disclosure is applied to paper and plastic film substrates respectively, and the use performance of the radiation curable gravure ink is further verified.

(1) Paper Substrate

The performance of the radiation curable gravure ink provided by the disclosure applied to a paper substrate is evaluated according to the requirements of the substrate and a test method in GB/T 26461-2011 paper gravure ink evaluation standard.

Gravure ink compositions were prepared according to the formulations in Table 5. With a Sotech solventless intaglio press (Model: A380) The ink is printed on printing offset paper according to GB/T 10335.1, with an LED lamp having a wavelength of 395 nm as radiation source and a light source intensity of 15 w/cm2, resulting in a printed pattern having a thickness of about 10 μm.

The storage stability and the curing drying speed of the ink composition, as well as the coating adhesion fastness, the printed product appearance and the odor were evaluated with reference to the afore mentioned evaluation method.

The test results are summarized in Table 5.

TABLE 5

| Components and parts by mass | | | | | | | |
|---|---|---|---|---|---|---|---|
| A-2 | B1-2 | B2-1 | C-3 | D-2 | E1-2 | E2 | E3 |
| 12 | 45 | 15 | 15 | 10 | 1 | 1 | 1 |

| Test Project | Test Result |
|---|---|
| Storage stability | ○ |
| Curing drying rate | 255 |
| Adhesion fastness | 95 |
| Printed product appearance | Qualified |
| Odor performance | ○ |

In addition, replacing the initiator in the above formula of Table 5 with

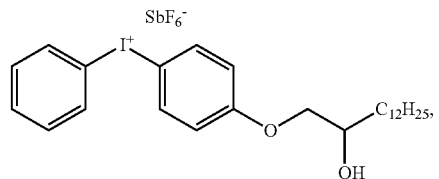

under the same preparation and test conditions, the same technical effects can be obtained.

(2) Plastic Film Substrate

The performances of the radiation curable gravure ink provided by the disclosure applied to different types of plastic film substrates are respectively evaluated according to the requirements of the substrate and a test method in QB/T 1046-2012 gravure plastic film surface printing ink evaluation standard.

Gravure ink compositions were prepared according to the formulations in Table 6. With a Sotech solventless intaglio press (Model: A380), the ink is printed on PET, PVC, PP and PE substrates, respectively, with an LED lamp having a wavelength of 395 nm as radiation source and a light source intensity of 15 w/cm2, resulting in a printed pattern having a thickness of about 10 μm.

The storage stability and the curing drying speed of the ink composition, as well as the coating adhesion fastness, the printed product appearance and the odor on different plastic film substrates were evaluated with reference to the afore mentioned evaluation method.

The test results are summarized in Table 6.

TABLE 6

| | Components and parts by mass | | | | | |
|---|---|---|---|---|---|---|
| | A-4 | B1-2 | B2-1 | C-2 | E1-1 | E2 | E3 |
| | 7 | 50 | 30 | 10 | 1 | 1 | 1 |
| Test Project | Test Result | | | | | |
| Storage stability | ○ | | | | | |
| Curing drying rate | 245 | | | | | |
| Substrate | PET | PVC | PP | PE | | |
| Adhesion fastness | 95 | 93 | 92 | 92 | | |
| Printed product appearance | Qualified | Qualified | Qualified | Qualified | | |
| Odor performance | ○ | ○ | ○ | ○ | | |

Replacing the initiator in the above formula of Table 6 with one of

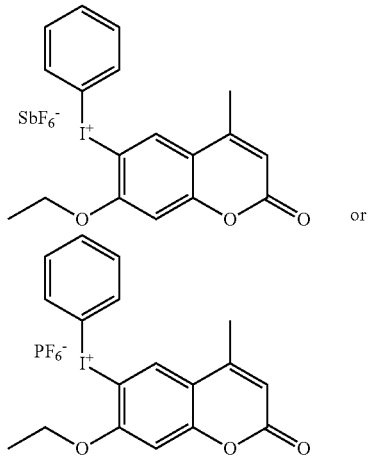

or under the same preparation and test conditions, the same technical effects can be obtained.

Therefore, as seen from the test results of Tables 5 and 6, the radiation curable gravure ink containing the modified pigment of the present disclosure can be applied to different substrate surfaces and has excellent use performances.

The formulation and testing procedure of Embodiment 1 was repeated with the radiation curable gravure inks of each of the Embodiments in Table 7, and the test results are shown in Table 8. The amounts of each component of the Embodiments in Table 7 are in mass percent.

TABLE 7

| | A-1 | B1-2 | B2-1 | C-3 | D-1 | E1-2 | E2 | E3 |
|---|---|---|---|---|---|---|---|---|
| Embodiment 13 | 2 | 60 | 30 | 8 | 0 | 0 | 0 | 0 |
| Embodiment 14 | 15 | 30 | 10 | 25 | 20 | 0 | 0 | 0 |
| Embodiment 15 | 10 | 20 | 20 | 20 | 30 | 0 | 0 | 0 |
| Embodiment 16 | 20 | 36 | 9 | 1 | 30 | 2 | 1 | 1 |
| Embodiment 17 | 12 | 50 | 30 | 3 | 0 | 5 | 0 | 0 |
| Embodiment 18 | 20 | 50 | 20 | 5 | 0 | 5 | 0 | 0 |
| Embodiment 19 | 5 | 50 | 30 | 15 | 0 | 0 | 0 | 0 |
| Embodiment 20 | 25 | 50 | 10 | 15 | 0 | 0 | 0 | 0 |

TABLE 8

| | Storage stability | Curing drying rate | Printed product appearance | Adhesion fastness | Odor performance |
|---|---|---|---|---|---|
| Embodiment 13 | ○ | 195 | Qualified | 90 | ○ |
| Embodiment 14 | ○ | 200 | Qualified | 90 | ○ |
| Embodiment 15 | ○ | 195 | Qualified | 90 | ○ |
| Embodiment 16 | ○ | 250 | Qualified | 92 | ○ |
| Embodiment 17 | ○ | 255 | Qualified | 95 | ○ |
| Embodiment 18 | ○ | 255 | Qualified | 95 | ○ |
| Embodiment 19 | ○ | 200 | Qualified | 90 | ○ |
| Embodiment 20 | ○ | 195 | Qualified | 90 | ○ |

The foregoing descriptions are only preferred embodiments of the present disclosure, and are not intended to limit the present disclosure. For those skilled in the art, the present disclosure can have various modifications and changes. Any modification, equivalent replacement, improvement, etc., made within the spirit and principle of the present disclosure should be included in the protection scope of the present disclosure.

What is claimed is:

1. A radiation curable gravure ink, comprising a pigment, wherein the pigment is a modified pigment, the modified pigment comprising a pigment and inorganic oxide nanoparticles coated on a surface of the pigment; the modified pigment has a DBP oil absorption of 215 ml/100 g-235 ml/100 g, a particle size of 0.45 μm-0.65 μm, and a pH value of 5-9, the inorganic oxide is selected from at least one of silica, titanium dioxide, iron oxide and alumina, the radiation curable gravure ink further comprises a cationic polymerizable compound and a cationic photoinitiator.

2. The radiation curable gravure ink according to claim 1, wherein the cationic polymerizable compound comprises an oxetane-based compound and an epoxy-based compound.

3. The radiation curable gravure ink according to claim 2, wherein the epoxy-based compound is an alicyclic epoxy compound.

4. The radiation curable gravure ink according to claim 2, wherein a mass ratio of the oxetane-based compound to the epoxy-based compound is 2-5:1.

5. The radiation curable gravure ink according to claim 1, wherein the cationic photoinitiator is selected from one or a combination of two or more of a group consisted of iodonium salt, sulfonium salt, and arylferrocenium salt.

6. The radiation curable gravure ink according to claim 1, wherein the radiation curable gravure ink comprises, by weight percent:
2%-20% of the modified pigment;
40%-90% of the cationic polymerizable compound;
1%-25% of the cationic photoinitiator;
0%-30% of a filler;
0%-5% of a sensitizer.

7. The radiation curable gravure ink according to claim 6, wherein the radiation curable gravure ink further comprises the filler.

8. The radiation curable gravure ink according to claim 6, wherein the radiation curable gravure ink further comprises the sensitizer.

9. Use of a radiation curable gravure ink according to claim 1 on paper, plastic or film.

10. The radiation curable gravure ink according to claim 3, wherein a mass ratio of the oxetane-based compound to the epoxy-based compound is 2-5:1.

11. The radiation curable gravure ink according to claim 2, wherein the radiation curable gravure ink comprises, by weight percent:
5%-15% of the modified pigment;
45%-80% of the cationic polymerizable compound;
3%-20% of the cationic photoinitiator;
0%-20% of the filler.

12. The radiation curable gravure ink according to claim 3, wherein the radiation curable gravure ink comprises, by weight percent:
5%-15% of the modified pigment;
60%-80% of the cationic polymerizable compound;
5%-15% of the cationic photoinitiator;
0%-20% of the filler;
0%-2% of the sensitizer.

13. The radiation curable gravure ink according to claim 1, wherein the pH value of the modified pigment is 5.5 to 8.

14. The radiation curable gravure ink according to claim 1, wherein the pigment is an organic pigment or an inorganic pigment.

15. The radiation curable gravure ink according to claim 14, wherein the organic pigment is selected from any one of an azo dye, a thioindigo dye, an indanthrone dye, an isoindanthrone dye, an anthanthrone dye, an anthraquinone dye, an isoviolanthrone dye, a triphenyldioxazine dye, a quinacridone dye and a phthalocyanine dye.

16. The radiation curable gravure ink according to claim 14, wherein the inorganic pigment is selected from any one of carbon black, titanium dioxide, silica, alumina, iron oxide and sulfide.

17. The radiation curable gravure ink according to claim 2, wherein the cationic polymerizable compound consists of the oxetane-based compound and the epoxy-based compound.

18. The radiation curable gravure ink according to claim 2, wherein the epoxy-based compound is an epoxy compound having an epoxycyclohexyl group.

19. The radiation curable gravure ink according to claim 4, wherein the mass ratio of the oxetane-based compound to the epoxy-based compound is 2-4:1.

20. The radiation curable gravure ink according to claim 6, wherein the radiation curable gravure ink comprises, by weight percent: 5%-15% of the modified pigment.

21. The radiation curable gravure ink according to claim 6, wherein the radiation curable gravure ink comprises, by weight percent: 45%-80% of the cationic polymerizable compound.

22. The radiation curable gravure ink according to claim 6, wherein the radiation curable gravure ink comprises, by weight percent: 60%-80% of the cationic polymerizable compound.

23. The radiation curable gravure ink according to claim 6, wherein the radiation curable gravure ink comprises, by weight percent: 3%-20% of the cationic photoinitiator.

24. The radiation curable gravure ink according to claim 6, wherein the radiation curable gravure ink comprises, by weight percent: 5%-15% of the cationic photoinitiator.

25. The radiation curable gravure ink according to claim 6, wherein the radiation curable gravure ink comprises, by weight percent: 0%-20% of the filler.

26. The radiation curable gravure ink according to claim 6, wherein the radiation curable gravure ink comprises, by weight percent: 0%-2% of the sensitizer.

27. The radiation curable gravure ink according to claim 8, wherein the radiation curable gravure ink further comprises an anthracene sensitizer.

28. The radiation curable gravure ink according to claim 10, wherein amass ratio of the oxetane-based compound to the epoxy-based compound is 2-4:1.

\* \* \* \* \*